United States Patent

Gelezunas

[15] 3,655,982
[45] Apr. 11, 1972

[54] APPARATUS FOR WATER DETECTION USING A RADIOACTIVE TRITIUM LABELLED REACTANT

[72] Inventor: Vincent L. Gelezunas, Devon, Pa.
[73] Assignee: General Electric Company
[22] Filed: Jan. 29, 1969
[21] Appl. No.: 795,111

[52] U.S. Cl.............250/106 T, 23/255 E, 250/43.5 MR, 250/83.6 FT
[51] Int. Cl............................................G21h 5/02
[58] Field of Search............250/106 T, 83.6 FT, 43.5 R; 23/232 C, 232 E, 255 E

[56] References Cited

UNITED STATES PATENTS 3,118,735  1/1964  Favre et al...........................23/230

OTHER PUBLICATIONS

Holtman et al., " Radiometric Determination of Moisture in Gases," Radioisotope Tracers in Industry and Geophysics, Symposium Proceedings Prague 1966, International Atomic Agency, Vienna 1967, pp. 261–270.

Thompson, R. C., Nucleonics, " Biological Applications of Tritium," Vol. 12, No. 9, Sept. 1954, pp. 31–35.

Primary Examiner—James W. Lawrence
Assistant Examiner—Davis L. Willis
Attorney—William G. Becker, Paul F. Prestia, Allen E. Amgott, Henry W. Kaufmann, Frank L. Neuhauser and Oscar B. Waddell

[57] ABSTRACT

A method and apparatus for detecting water using an appropriate radioactive labelled alkaline earth hydride as a reactant. Fluid from a gas liquid or solid sample to be tested is passed through a bed of the reactant. The water present in the sample reacts with the reactant forming a radioactive product whose radioactivity is then measured to give a quantitative determination of the amount of water in the sample or a qualitative determination of the presence of water.

3 Claims, 3 Drawing Figures

Patented April 11, 1972
3,655,982
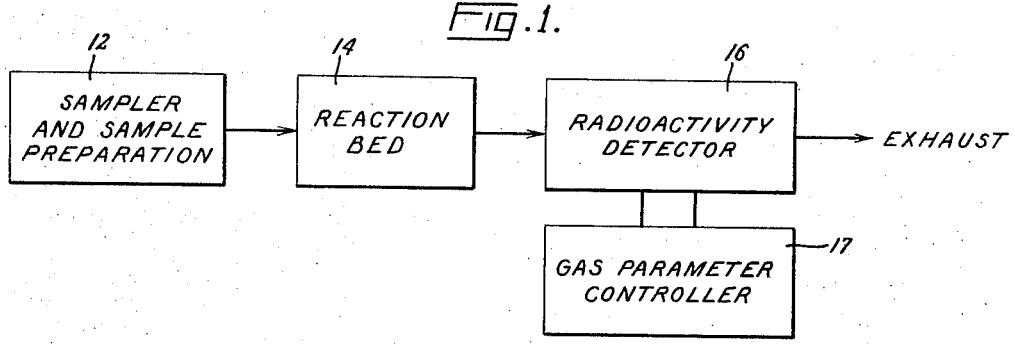
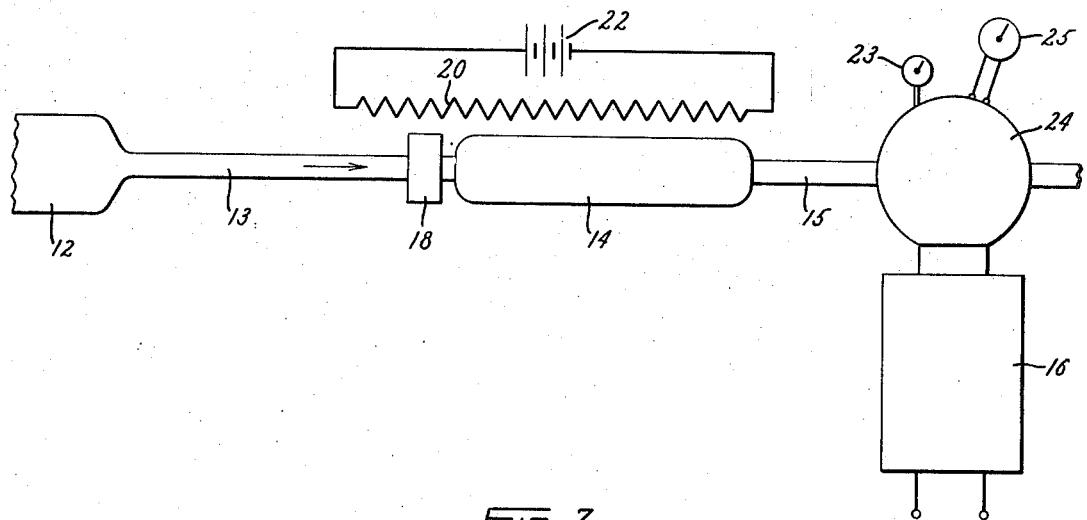
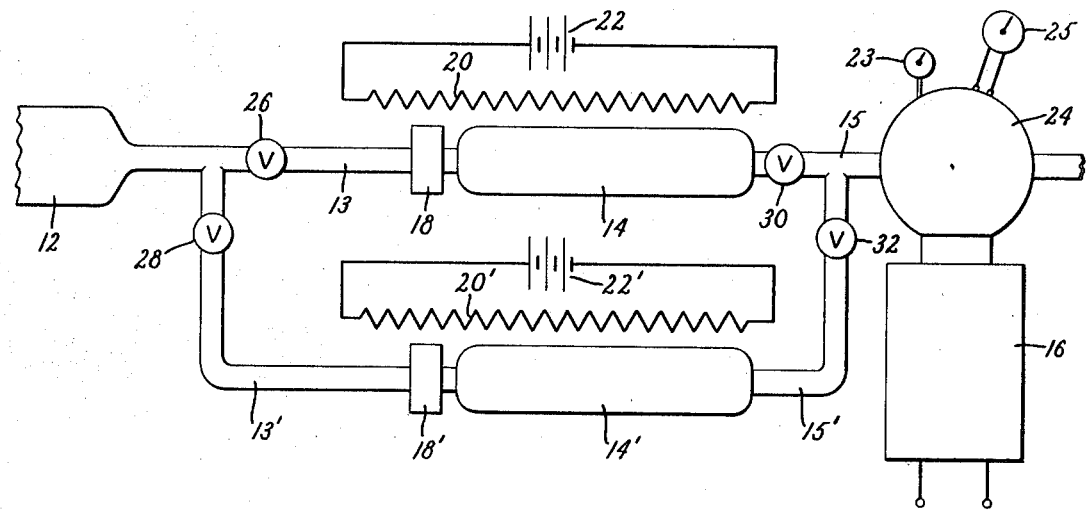
INVENTOR:
VINCENT L. GELEZUNAS,
BY
AGENT

APPARATUS FOR WATER DETECTION USING A RADIOACTIVE TRITIUM LABELLED REACTANT

BACKGROUND OF THE INVENTION

The subject invention relates to the field of fluid detection and, in particular, to methods and apparatus for detecting the concentration or presence of water.

There are many different methods of detecting water concentration including IR and mass spectrometers, alumina hygrometer, electrolysis, and gas chromatography. However, all of these are quite limited in sensitivity, with the best having a sensitivity limit of about $10^-{}_2$ micrograms per liter. Also, the instruments used in these methods are generally quite complicated and have limited thermal and shock resistance. Water detectors using radioactive labelled calcium carbide and barium carbide as reactants have been tried, but are limited for many purposes in terms of their sensitivity, selectivity and ability to provide consistent results as the reactant is being depleted. Heretofore water detection systems free of the foregoing limitations have been unknown.

SUMMARY OF THE INVENTION accordingly, it is an object of the subject invention to provide a highly sensitive water detection means.

Another object of the subject invention is to provide a highly selective method and apparatus for water detection.

Still another object of the subject invention is to provide a water detector which is quite simple in operation and which has a high tolerance for mechanical shock.

A further object of the subject invention is to provide a method and apparatus for detecting water of a sample over a wide concentration range.

The subject invention satisfies the above-stated objects by providing a chemical/radiological water detector and water detection process. A fluid sample is passed through a reactant bed containing a suitable radioactive labelled alkaline earth hydride reactant. The radioactivity of the gaseous reaction products is then measured by a suitable device. The amount of radioactive material in the gaseous products and hence the amount of radioactivity detected is proportional to the water concentration of the input sample. In the preferred embodiment the reactant used is tritium labelled calcium hydride. One or more parallel reaction beds may be provided to allow the detector to operate over two or more ranges.

The subject matter which is regarded as the present invention is particularly pointed out and distinctly claimed in the concluding portion of the specification.

BRIEF DESCRIPTION OF THE DRAWINGS

The present invention, however, both as to organization and method of operation, together with further objects and advantages thereof, may best be understood by reference to the description taken in connection with the accompanying drawings in which:

FIG. 1 is a block diagram of the process of the subject invention;

FIG. 2 is a schematic view of one embodiment of the apparatus of the subject invention; and FIG. 3 is a schematic view of the preferred embodiment of the subject invention.

DESCRIPTION OF THE PREFERRED EMBODIMENTS

FIG. 1 shows in block diagram form the steps of the basic water detection process of the subject invention. Briefly, the fluid sample 12 containing the fluid whose water concentration is to be determined is ducted to a reaction bed 14 containing a suitable radioactive labelled reactant in substantial stoichiometric excess to allow a reaction to take place. A radioactivity detector 16 then measures the amount of radioactive material produced by the reaction is proportional to the amount of water in the input sample, the water concentration in the sample is determined as a function of the radioactivity of the end products. Means 17 are also provided for determining the parameters of the gas flow through the radioactivity detector which are used to determine the water concentration in the input sample. For qualitative analysis, detection of any radioactivity above background in the reaction products indicates the presence of water in the sample.

The reactant is a radioactive labelled-alkaline earth hydride from the group consisting of calcium hydride, strontium hydride, and barium hydride. Radioactive labelling may be accomplished by a simple exchange reaction as follows. Hydride powder is exposed to a mixture of tritium and hydrogen gas in a closed system at about 350° C. for approximately 48 hours. The specific activity of the final product depends on the quantity and the ratio of tritium to hydrogen in the initial gas mixture. In the preferred embodiment, tritium labelled calcium hydride is used because it is inexpensive and readily (commercially) available in a chemically pure form. The primary reactions of calcium tritide with water are as follows:

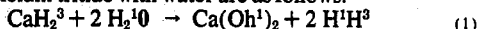
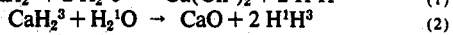

From these reactions it can be seen that the products of the reactions are calcium hydroxide, calcium oxide and molecules of two isotopes of hydrogen. The reactions of calcium hydride (without tritium) are substantially the same as reactions (1) and (2) of the above except that $H_2{}^1$ is formed instead of $2H^1H^3$. The hydrogen molecules from the calcium tritide and the reaction product mixture may contain $H_2{}^1$, $H_2{}^3$ and $H^1H^3$.

Since the specific activity of the reactant mixture, which is indicative of the concentration of radioactive tritide in the mixture, is known and the radioactivity detected gives a quantitative measurement of the amount of tritium ($H^3$) in the product gas, the amount of water in the input sample can be determined.

During operation of the subject invention, either or both reactions (1) and (2) or a hydration reaction of the calcium oxide or calcium hydroxide may occur. Generally, the higher the temperature of the reaction, the greater the tendency will be for reaction (2) to take place in preference to reaction (1) and the lesser the tendency will be for a hydration reaction to take place. Also, due to the reaction rates and equilibrium constants of the reactions, reactions (1) and (2) will take place much more readily and rapidly than the hydration reactions. It is desirable for reactions (1) and (2) to occur in preference to the hydration reactions because the hydration reactions tend to prevent water in the sample from reacting with the hydride to form hydrogen gas which would lead to an erroneous determination of the water concentration.

FIG. 2 shows an embodiment of the subject invention for use with a gas sample. The sample is ducted by pipe 13 to reaction bed 14 of radioactive labelled calcium hydride. The sample gas and reaction bed 14 are preferably heated to a predetermined temperature by any appropriate heating means such as resistance heater 20 which is connected to a power source 22, as shown in FIG. 2. The product of the reaction in bed 14 is gaseous hydrogen, including the radioactive hydrogen isotope tritium ($H^3$), which is piped via a tube 15 to detector chamber 24. Radioactivity detector 16 is used in conjunction with detector chamber 24 to provide a quantitative indication of the amount of radioactive material; i.e., tritium, in the gaseous reaction products or a qualitative indication of the presence of radioactive material.

Any type of radioactivity detector sensitive to the type of radiation emitted by tritium (beta particle) may be used for a stationary setup; this may conveniently be an ionization chamber. However, for more mobile operation, a compact radiation detector such as an avalanche semiconductor radiation detector 16, as shown in FIG. 2, may be used.

If a continuous sample is to be taken, an open-ended detector chamber, such as that shown in FIG. 2, is used; and for a sample, of a discrete volume a detector chamber closed at one end is used. In either case, in order for the water concentration to be determined, the volume of the detector chamber, the pressure and temperature of the gases therein, the specific activity of the calcium hydride in the reaction bed and the radioactivity of the gases within the detector chamber (as indicated by the output signal from the radioactivity detector) must be determined. The volume of the detector chamber is a predetermined, fixed quantity. The pressure and temperature within the detector chamber may be measured by any suitable pressure and temperature measuring means such as pressure gage 23 and thermocouple with meter 25 shown in FIG. 2.

The reaction within reaction bed 14 is independent of the fluid flow rate therethrough except for very low or very high flow rates. To prevent any error due to flow rate extremes, it is desirable to provide means for regulating the flow rate to the reaction bed 14, such as the flow rate regulator 18 shown in FIG. 2, which is located upstream of the reaction bed 14.

If the amount of water in a solid sample is to be measured, the solid sample is first heated so that the water contained therein is vaporized. This water vapor is then mixed with a dry, inert carrier gas and ducted through the water detector apparatus as if a gas sample were to be analyzed.

It is obvious to one skilled in the art that simple modifications may be made to the apparatus of the subject invention to allow its use with a liquid sample. These modifications may include a separator located downstream of the reaction bed for separating the liquid which has passed through the reaction bed from the gases produced therein.

The basic process of the subject invention which is comprised of reacting fluid from a sample with a given radioactive labelled alkaline earth hydride and measuring the radioactivity of the gaseous products of the reaction is the same for any type of gas, liquid or solid sample.

The output signal of the radioactivity detector bears a substantially linearly proportional relationship to the water concentration of the input sample where all the parameters of the water detector apparatus are kept constant.

As an example, Chart I illustrates the relationship between the radioactivity detector output signal (in this case the output current of an ionization chamber) and the water concentration of continuous gas samples. A reaction bed containing radioactive labelled calcium hydride of a given specific activity and an open-ended detector chamber of a given volume were used. The reaction bed temperature was 136° C., the flow rate to the reaction bed was 140 cc/min., and in the detector chamber the pressure was 15 psia and the temperature was 24° C.

CHART I

Ionization chamber
current amp. × $10^{12}$    Water concentration
p.p.m.

| | |
|---|---|
| 400 | 1000 |
| 38.5 | 100 |
| 3.9 | 10 |
| .405 | 1.0 |

For relatively high water concentrations in the input sample (greater than 100 ppm) the water detector of the subject invention is substantially independent of the temperature of the reaction bed. However, for low water concentrations (less than 100 p.p.m. the water detector is independent of the reaction temperature only when this temperature is within ppm) a given range. This temperature range is from approximately 80° C. – 155° C. and is the desired operating range for the reaction bed. As long as the temperature is kept within this range, minor temperature fluctuations of the reaction bed should have little if any effect on the output signal of the radioactivity detector. Also, if the reaction temperature is kept relatively constant, the temperature of the gases within the detector chamber should be substantially constant.

In FIG. 3 the preferred embodiment of the subject invention is shown. A parallel reaction bed flow path is provided including its own flow rate regulator 18', reaction bed 14 and heating means 20' for the sample gas and second reaction bed.

Valve means are located in pipes 13, 13' and tubes 15, 15' to allow selection of either the first or second reaction bed flow paths. The valve means shown in FIG. 3 include four valves 26, 28, 30, 32 in pipes 13, 13' and tubes 15, 15' respectively. When the sample is to flow in the first flow path, valves 28 and 32 are closed and valves 26 and 30 opened. Similarly, valves 26 and 30 are closed and valves 28 and 32 opened when the second flow path is to be used. The particular valve means shown is merely exemplary and any other suitable valve system may be used.

The use of the dual parallel flow path configuration permits utilization of the water concentration apparatus over an extremely wide range of water vapor concentration. For example, one flow path (of high sensitivity) for example the first flow path, may be used for relatively low concentrations of water vapor and the second flow path (of lower sensitivity) used for relatively high concentrations. The different sensitivities of the flow paths can be obtained by using in the second reaction bed calcium hydride having a lower specific activity than the calcium hydride in the first reaction bed.

By the use of the parallel flow path configuration, the sensitivities of the flow paths can be chosen so as to be compatible with the sensitivity range of the radioactivity detector 16. If a high sensitivity flow path were used with a sample having a high water concentration, the radioactivity detector would probably be overloaded, thereby giving an erroneous indication of water concentration. However, by using the flow path of lower sensitivity the radioactive products of the reaction as seen by the detector 16 would be in the range of usable sensitivity of the detector. Similarly, a high sensitivity flow path should be used when the water concentration in the sample is very low because if a low sensitivity flow path were used, the radioactivity detector would not be able to detect radioactivity.

The operation of each of the flow paths of the embodiment shown in FIG. 3 is the same as the operation of the flow path of the embodiment shown in FIG. 2. In both the embodiments shown for the most convenient operation of the apparatus means may be provided for regulating the pressure and temperature of the gases within the detector chamber at a constant value so that the output of the radioactivity detector can be calibrated to read out directly the concentration of the water in the input sample for a predetermined specific activity of the reactant. In an embodiment including two or more parallel flow paths, a separate calibration should be provided for each flow path because the reactant used in each flow path has different specific activity than the reactant in the other flow paths.

If the subject invention is used only for detecting the presence of water in a sample it is not necessary to control the parameters of the apparatus to the same degree as when the subject invention is used to detect the concentration of water. The parameters must merely be sufficiently controlled so that the radioactivity detector provides a noticeable indication whenever the water concentration in a sample is above a given level.

One of the major advantages of the use of radioactive-labelled calcium hydride is that the reaction rate of the calcium hydride bed is substantially uniform until the calcium hydride therein is depleted. This uniform reaction rate is due primarily to the fact that the solid products of the reaction (i.e. calcium oxide and calcium hydroxide) are generally quite porous in nature and are of a density substantially different from the density of the calcium hydride. The difference in densities causes the calcium oxide or calcium hydroxide to spall off the surface of the calcium hydride, thereby allowing new surface of the calcium hydride to be exposed to the input sample.

A water detector using radioactive-labelled strontium or barium hydride in place of the radioactive-labelled calcium hydride operates in the same manner as a water detector using calcium hydride and has substantially the same advantages. However, an additional advantage of using radioactive-labelled calcium hydride is that it is more cheaply and readily available in a chemically pure form than the other named hydrides.

Thus the subject invention provides water detection means having a wide range of sensitivity extending down to a concentration of at least one part per billion, a high specificity for water, a capability of detecting water from almost any source, and an ability to operate over a wide range of temperature and pressure conditions in either a continuous or discontinuous mode.

It is obvious to one skilled in the art that many modifications can be made to the subject invention without departing from the scope thereof.

What I desire to secure by Letters Patent of the United States is:

1. Apparatus for determining the water concentration in a fluid-containing sample comprising:
   a. first and second reaction beds for reacting with the fluid from said sample including therein a radioactive tritium labelled alkaline earth metal hydride reactant from a group consisting of calcium hydride, strontium hydride and barium hydride;
   b. detection means including a detector chamber to which gases from one of said reaction beds are ducted and a radioactivity detector for providing an indication of the amount of radioactive products within said detector chamber;
   c. valve means for selectively controlling the flow of fluid through said first reaction bed and said second reaction bed to said detector chamber.

2. Apparatus as in claim 1 wherein said reactant within one of said reaction beds has a lower specific activity than said reactant within the other of said reaction beds.

3. Apparatus as in claim 1 further including heating means for heating at least one of said reaction beds to a temperature within a given temperature range.

* * * * *